United States Patent Office 3,573,925
Patented Apr. 6, 1971

3,573,925
PROCESS
Roger L. Harned, Terre Haute, Ind., assignor to Commercial Solvents Corporation, New York, N.Y.
No Drawing. Continuation-in-part of application Ser. No. 647,636, June 21, 1967. This application Apr. 16, 1968, Ser. No. 721,596
Int. Cl. A23k 1/17; C07d 85/12
U.S. Cl. 99—9
17 Claims

ABSTRACT OF THE DISCLOSURE

Stabilization of cycloserine in a fermented beer containing cycloserine and O-carbamyl-D-serine by complexing same with a zinc salt.

CROSS-REFERENCE TO RELATED APPLICATIONS

This application is a continuation-in-part of U.S. Ser. No. 647,636, filed June 21, 1967, now abandoned.

BACKGROUND OF THE INVENTION

This invention relates to the production of antibiotic compositions useful in animal feeds. In a particular aspect, this invention relates to a process for the production of an animal feed supplement composition containing cycloserine (CS) in combination with O-carbamyl-D-serine (OCS).

It is known that various antibiotics promote growth and increase feed efficiency of animals. Such antibiotics include bacitracin, neomycin, penicillin, the tetracyclines, the sulfa drugs, tylosin, chloramphenicol, erythromycin and others. It is also known that the pharmacological activity in animals of these antibiotics is potentiated by a combination of CS and OCS. However, the growth promoting activity of the antibiotic is not improved when either CS or OCS alone are administered with the antibiotic in amounts equivalent to those of the three component mixtures.

Antibiotics which are potentiated by an admixture of cycloserine and O-carbamyl-D-serine include neomycin; bacitracin, including the active salts of bacitracin such as zinc bacitracin, manganese bacitracin and bacitracin methylene-disalicylate, feed grade bacitracin and bacitracin-containing materials; penicillin; the tetracyclines, including tetracycline, chlortetracycline and oxytetracycline; tylosin; chloramphenicol; erythromycin; and sulfa drugs, including sulfanilamidoquinoxaline, sulfamethoxypyridazine, sulfathiazole, sulfanilamide, sulfamethazine, and sulfadimethoxine.

Cycloserine is a broad spectrum antibiotic possessing activity against both gram negative and gram positive bacteria. It is amphoteric, very soluble in water and forms insoluble salts with silver, mercury, zinc and copper. Cycloserine is produced by fermentation utilizing cycloserine-producing strains of microorganisms of the genus Streptomyces such as Streptomyces orchidaceous, Streptomyces virginiae, and Streptomyces lavendulae. Several processes are available; namely, those of Harned, U.S. Patent 3,090,730; British Patent 768,007; and Shull et al., U.S. Patent 2,773,878.

The method of Harned, U.S. Patent 3,090,730, has been very successful for the production of cycloserine. According to this method, a cycloserine-producing microorganism of the genus Streptomyces is cultivated in an aqueous fermentation medium consisting of a carbohydrate source, a magnesium source, a potassium source, a phosphate source, an iron source, a zinc source, a manganese source, and a chemically defined nitrogen source at a temperature ranging from about 25° C. to about 37° C. for a period of from about three to five days wherein a ratio of carbohydrate to available nitrogen is maintained at about 10–20 to 1.

In the above process, O-carbamyl-D-serine is simultaneously produced. Its physical and chemical properties and method of preparation by the cultivation of Streptomyces polychromogenus are described in U.S. Patent 2,885,433. It slowly decomposes at elevated temperatures.

As previously described, cycloserine and O-carbamyl-D-serine have been found useful in combination with other antibiotics in animal feed compositions. Because of the poor stability of cycloserine in the presence of moisture, it has been necessary to prepare the CS and OCS separately in relatively pure state, then combine them with the other feed ingredients to produce the growth-promoting feed composition. Consequently, the composition has been relatively expensive to produce and difficult to store.

Cycloserine is unstable at high concentrations in water due to formation of the dimer $(C_3H_6O_2N_2)_2$. The rate of this reaction is directly proportional to the concentration. In solution at the maximum aqueous solubility of 100 mg./ml. it is very unstable but at 1–10 mg./ml. it is relatively stable. In dry form the pure free acid is stable overnight at 100° C., but in the presence of 15% moisture it is rapidly inactivated at even a much lower temperature. When it is mixed into feeds which contain significant amounts of moisture, the small amount of cycloserine in the feed becomes a concentrated solution in the moisture present in the feed and the activity therefore cannot be maintained.

SUMMARY OF THE INVENTION

It is an object of this invention to provide a process for the production of an antibiotic composition useful in animal feeds.

A second object of this invention is to provide an improved process for the production of an animal feed composition containing cycloserine in combination with O-carbamyl-D-serine.

A third object of this invention is to provide a process for the production of a crude zinc cycloserine-O-carbamyl-D-serine composition.

Other objects of this invention will be obvious to those skilled in the art from the disclosure herein.

It has now been discovered that the CS-OCS combination suitable for use in animal feed compositions can be produced economically in a stable form. According to the new process, CS and OCS are formed in a nutrient fermentation medium in accordance with previous processes. After the fermentation is complete, the fermentation medium, known as broth or, more commonly, as "beer" to those skilled in the art, is treated with a zinc compound, the pH is adjusted, if necessary, to within the range of from about 6.0 to 9.5. The mixture is then concentrated and dried by any suitable method or the CS-OCS combination is precipitated by adding a lower alkanol to the mixture and recovered therefrom. The CS is obtained in the form of the zinc complex.

DETAILED DESCRIPTION

The process of this invention can be used for the preparation of a CS-OCS combination from any fermentation medium containing suitable amounts of these two compounds. Preferably, the CS and OCS are prepared by fermentation according to the method of Harned, U.S. Pat. 3,090,730.

Either whole beer, i.e. containing the cells of the microorganism, or filtered beer is suitable for use in the process of this invention. The use of whole beer is advantageous because the drying step can be successfully accomplished either by spray drying or drum drying, whereas when filtered beer is used, drum drying is unsatisfactory. Also, the cells of the microorganism present in the whole beer have nutritional value and the dried whole beer is less hygroscopic than dried filtered beer. However, the concentration of CS-OCS in the final composition is somewhat lower than when filtered beer is used. Thus, there are advantages to the use of either one, and the process can be easily operated accordingly. In general, the process is preferably operated with filtered beer to obtain the higher CS-OCS levels and when filtered beer is used it is generally treated with char (activated carbon) as is known in the art.

When the beer, whole or filtered, has been delivered to the reaction vessel, a zinc compound is added to provide at least about 0.5 to 2 moles of zinc per mole of cycloserine in the beer. From 1 to 2 moles of zinc can be used, but 0.5–1 moles of zinc per mole of cycloserine is preferred. The zinc compound is one having a nutritionally acceptable anion inasmuch as it becomes an ingredient of the final composition. Zinc compounds suitable for the practice of this invention include, but are not limited to, the oxide, chloride, sulfate, nitrate, carbonate, acetate, propionate, and tartrate. Zinc oxide is a preferred zinc compound.

After addition of the zinc compound, the mixture is well agitated to insure thorough mixing. If the pH is below about 6.0, it is adjusted to within the range of from about 6.0 to about 9.5, preferably from 8.0 to 8.5. The pH adjustment is effected by gradual addition accompanied by thorough agitation of finely ground calcium hydroxide, calcium oxide or calcium carbonate, either as the dry powder or as an aqueous suspension. The calcium compound used should be free from deleterious contaminants.

After addition of the zinc salt, the beer is preferably concentrated by evaporation at a pressure below atmospheric pressure at a temperature of up to about 60° C. in an evaporator, generally to about 1.0% to 25%, preferably about 20%, of the initial volume, and is then dried or recovered by any suitable means, e.g. by spray drying, or if the beer was not filtered, by drum drying. The resulting product is a relatively stable, light tan free-flowing product, slightly hygroscopic at high humidities. The dried solids containing the zinc complex of cycloserine and OCS are then employed in animal feed compositions to supply the CS-OCS combination as is known in the art.

In a preferred embodiment, the filtered beer is concentrated to about 1.5% to 3.5%, preferably about 2.5% by volume and a lower alkanol of from 1 to 3 carbon atoms is added in a volume of from approximately 1 to 2 times that of the concentrate. The mixture is cooled to about 0–10° C., for a length of time sufficient to effect precipitation of the zinc cycloserine-OCS, usually for about 14–18 hours, for example. The precipitate is filtered, washed with cold methanol and dried under a vacuum to remove the alkanol.

The lower alkanol suitable for the recovery step can be methanol, ethanol, 2-propanol or a mixture thereof. Methanol is a preferred alkanol and a mixture of methanol and 2-propanol is particularly preferred. When 2-propanol is employed as the only alkanol, the viscosity of the mixture is high making it difficult to handle and filter. Accordingly it is preferred to dilute the 2-propanol with methanol to within the range of about 30–70% by volume. It is to be understood however that the process is not to be limited to such a mixture, since either alkanol can be used alone, and any mixture is suitable.

The following examples illustrate the invention but are not to be considered limiting. In these examples the beer was obtained from regular plant fermentation runs produced according to the following method.

*Streptomyces orchidaceous* was cultivated for a period of 24 hours at 30° C. in an aqueous seed culture medium of the following composition:

| | G./l. |
|---|---|
| Glucose | 10 |
| Soybean meal | 20 |
| Calcium carbonate | 2 |

A 9000-gallon portion of the following medium was then placed in a fermentor and the contents thereof sterilized for 15 minutes at 121° C.

| | Percent by wt. |
|---|---|
| Glucose | 5 |
| $MgSO_4 \cdot 7H_2O$ | 0.05 |
| $K_2HPO_4$ | 0.05 |
| $FeSO_4 \cdot 7H_2O$ | 0.002 |
| $ZnSO_4 \cdot 7H_2O$ | 0.002 |
| $MnSO_4$ | 0.001 |
| Lard oil | 0.4 |

Sterile urea, 0.48%, was then added to the sterilized medium. The fermentor was inoculated with 800 gallons of seed culture prepared as above-described, and the medium was incubated at 30° C. for 86 hours, the medium being aerated at a rate of 800 cubic feet per minute. At the end of the 86-hour fermentation period the fermented medium, or beer, contained 2.6 mg./ml. of cycloserine.

EXAMPLE 1

A portion of fermented beer prepared as above was filtered. It assayed 2.22 g./l. cycloserine, 4.5 g./l. O-carbamyl-D-serine, and had a total solids of 1.17%. The filtered beer was divided into 5 portions, samples 1–3 of 8 liters each and samples 4 and 5 of 84 lbs. each.

To each portion were added zinc sulfate crystals ($ZnSO_4 \cdot 7H_2O$), resulting in a drop of pH. When the pH stabilized, after 15–30 minutes, it was adjusted by gradually adding powdered calcium hydroxide. The resulting mixture was then spray dried, except for samples 4 and 5 which were first concentrated. The dried product was then assayed for cycloserine and O-carbamyl-D-serine. The data are given in the following table.

| Sample | Zinc sulfate, grams | pH | Weight of product | Assay, percent weight CS | OCS |
|---|---|---|---|---|---|
| 1 | 52 | 6.8 | | 12.0 | 15.8 |
| 2 | 104 | 6.8 | 137 | 10.45 | 16.8 |
| 3 | 26 | 6.9 | 72 | 10.0 | 18–25 |
| 4 | 274 | 6.8 | 590 | 6.2 | 18–25 |
| 5 | 494 | 6.8 | 776 | 6.2 | 17 |

Sample 1 was formulated in an animal feed to provide a concentration of 500 p.p.m. cycloserine. A portion was exposed in a 75% relative humidity chamber at room temperature and at 45° C. to evaluate the stability. O-carbamyl-D-serine is known to be much more stable than cycloserine, so a preparation having satisfactory stability with respect to the latter would also be satisfactory with respect to the former. Accordingly, the OCS was not assayed. The following data were obtained.

| | Percent of original CS | |
|---|---|---|
| Time | Room temperature | 45° C. |
| Week: | | |
| 1 | 85 | 58 |
| 2 | 62 | 32 |
| 4 | 43 | 15 |
| 8 | 28 | 3 |

This is a very severe test and the sample was determined to have a satisfactory stability.

EXAMPLE 2

The experiment of Example 1 was repeated except that 84 lb. portions of whole beer were used in place of filtered beer. In this experiment a portion of the beer was spray dried and a portion was drum dried. No stability tests were conducted in this experiment.

| Sample No. | Zinc sulfate | pH | Method of drying | Weight of product | Assay, percent weight CS | Assay, percent weight OCS |
|---|---|---|---|---|---|---|
| 6 | 494 | 7.5 | 8 lb., drum | 271 | 2.8 | 11.7 |
|   |   |   | 29 lb., spray | 650 | 4.5 | 13.3 |
| 7 | 247 | 6.8 | 8 lb., drum | 271 | 3.2 | 12.5 |
|   |   |   | 27.5 lb., spray | 737 | 4.5 | 12.7 |

EXAMPLE 3

The experiment of Example 1 was repeated, except that all samples were concentrated before drying using 84 lb. of beer having 1.45% solids and assaying 2.5 g./l. CS and 5.9 g./l. OCS. The following results were obtained.

| Sample No. | Zinc sulfate | pH | Weight of product | Assay, percent weight CS | Assay, percent weight OCS |
|---|---|---|---|---|---|
| 7 | 247 | 7.9 | 660 | 12.6 | 23.3 |
| 8 | 247 | 9.4 | 690 | 12.6 | 22.1 |
| 9 | 78.5 | 8.2 | 526 | 11.7 | 26 |

In sample 9, zinc oxide was substituted for zinc sulfate and no pH adjustment was necessary. The original assay of beer was 2.36 g./l. CS and 5.2 g./l. OCS.

Portions of the above samples were mixed with animal feeds and were exposed in a 75% relative humidity chamber at room temperature and at 45° C. to evaluate the stability. The following data were obtained.

| | Percent of original CS | | | | | | | |
|---|---|---|---|---|---|---|---|---|
| | Room temperature, week | | | | 45° C., week | | | |
| Sample No. | 1 | 2 | 4 | 8 | 1 | 2 | 4 | 8 |
| 7 | 72 | 67 | 49 | 30 | 46 | 32 | 19 | 12 |
|   | 76 | 68 | 55 | 45 | 55 | 47 | 24 | 17 |
| 8 | 77 | 64 | 52 | 28 | 37 | 24 | 10 |   |
| 9 | 84 | 71 | 51 | 45 | 37 | 21 | 5 |   |
|   | 84 | 78 | 64 | 39 | 43 | 31 | 10 |   |

The samples were determined to have satisfactory stability.

Example 4

The experiment of Example 2 using whole beer was repeated. The beer in samples 10 and 11 contained 2.0 g./l. CS and 3.7 g./l. OCS. In samples 12 and 13, the beer contained 1.92 g./l. CS and 3.7 g./l. OCS. Total solids was 2.9%. No pH adjustment was necessary for sample 11, where zinc oxide was substituted for zinc sulfate. The following results were obtained.

| Sample No. | Method of drying | Zinc compound | Mole ratio, Zn:CS | pH | Percent recovery CS | Percent recovery OCS |
|---|---|---|---|---|---|---|
| 10 | Spray | ZnSO₄ | 1.1 | 8.7 | 89 | 92 |
|   | Drum |   |   |   | 76 | 93 |
| 11 | Spray | ZnO | 1.2 | 6.9 | 64 | 90 |
|   | Drum |   |   |   | 50 | 90 |
| 12 | Spray | ZnSO₄ | 2.4 | 7.1 | 58 | 93 |
|   | Drum |   |   |   | 56 | 98 |
| 13 | Spray | ZnSO₄ | 1.6 | 9.2 | 92 | 100 |
|   | Drum |   |   |   | 85 | 91 |

Example 5

Three drums (55 gallons each) of filtered beer were obtained from the plant and the pH was adjusted to 6.6. The beer assayed 2.4 g./l. CS and had a total solids of 1%. The OCS content was not determined. To each drum were added 2 moles of zinc oxide per mole of CS. A series of 10 gallon (84 lb.) aliquots was withdrawn and each aliquot was concentrated to 12–18 lb., usually about 16 lb. The pH was then adjusted to within 7 to 8 with calcium hydroxide and the mixtures were spray dried.

The following results were obtained:

| Sample No. | Concentrate to, pound | Weight of Ca(OH)₂, grams | pH | Weight of product | Percent CS |
|---|---|---|---|---|---|
| 14 | 16 | 40 | 7.8 | 600 | 8.4 |
| 15 | 16 | 20 | 7.0 | 933 | 9.6 |
| 16 | 16 | 20 | 7.0 | 933 | 9.6 |
| 17 | 12 | 30 | 7.6 | 863 | 8.3 |
| 18 | 16 | 30 | 7.6 | 863 | 8.3 |
| 19 | 16 | 30 | 7.6 | 535 | 8.9 |
| 20 | 15 | 30 | 7.4 | 981 | 7.8 |
| 21 | 16 | 30 | 7.4 | 981 | 7.8 |
| 22 | 16 | 30 | 7.4 | 800 | 7.2 |
| 23 | 14 | 30 | 7.4 | 800 | 7.2 |
| 24 | 18 | 30 | 7.4 | 863 | 7.5 |

A composite of 5 of the above samples was tested for stability in a relative humidity chamber at 75% relative humidity at room temperature and at 45° C. A portion was tested "as is" and another portion was blended into a typical animal feed. The following results were obtained.

| | Percent of initial cycloserine | | | | | | | |
|---|---|---|---|---|---|---|---|---|
| | Room temperature | | | | 45° C. | | | |
| Week | 1 | 2 | 4 | 8 | 1 | 2 | 4 | 8 |
| Blended in feed | 88 | 91 | 74 | 66 | 86 | 62 | 36 | 9.1 |
| "As is" | 97 | 70 | 46 | 44 | 7.8 | 3.5 |   |   |

Example 6

The experiment of Example 1 is repeated except that zinc chloride is substituted for zinc sulfate. The resulting product possesses good stability.

Example 7

The experiment of Example 1 is repeated except that zinc nitrate is substituted for zinc sulfate. The resulting product possesses good stability.

EXAMPLE 8

The experiment of Example 1 is repeated except that zinc acetate is substituted for zinc sulfate. The resulting product possesses good stability.

EXAMPLE 9

The experiment of Example 1 is repeated except that zinc propionate is substituted for zinc sulfate. The resulting product possesses good stability.

EXAMPLE 10

The experiment of Example 1 is repeated except that zinc tartrate is substituted for zinc sulfate. The resulting product possesses good stability.

EXAMPLE 11

A portion of fermented beer prepared as hereinbefore set forth was filtered and treated with char. It assayed 2.80 g./l. cycloserine, 4.04 g./l. O-carbamyl-D-serine and had a total solids content of 11.3 g./l. The beer was divided into five samples of 84 lb. each. Two of the portions were set aside for the experiment of Example 12.

To sample number 1 was added 130 g. of zinc oxide in a ratio of approximately 1.5 moles ZnO per mole of cycloserine, giving a pH of 7.8. Calcium hydroxide (about 15 g.) was added, raising the pH to 8.2. The mixture was concentrated by evaporation to about 16.5 lb. and was then spray dried to yield 507 g. of product having the assay shown in the table below.

Sample 2 was treated in a manner similar to sample 1 except that 86 g. of zinc oxide was used to give a mole ratio to cycloserine of approximately 1:1. After spray drying, 429 g. of product was obtained having the assay shown in the table.

Sample 3 was treated similarly to samples 1 and 2 except that 43.3 g. of zinc oxide was used in a ratio of approximately 0.5 mole of ZnO per mole of cycloserine and the resulting pH was 8.0. Calcium hydroxide, 7.0 g., was added to give a pH of 8.2. After spray drying, 360 g. of product was obtained.

The samples obtained above were then tested for stability of cycloserine by storing for two weeks in a constant humidity chamber at 75% relative humidity at room temperature, and in capped vials at 45° C. for seven weeks. As expected, the cycloserine was poorly stable when exposed to high humidity, but was of satisfactory stability at elevated temperature when protected from moisture. The data are presented in the following table:

| Sample No. | Cycloserine, percent weight | | | Percent of initial at— | |
|---|---|---|---|---|---|
| | Initial | 2 weeks | 7 weeks [1] | 2 weeks | 7 weeks [1] |
| 1 | 10.46 | 3.0 | 10.3 | 29 | 99 |
| 2 | 12.51 | 3.5 | 11.4 | 28 | 91 |
| 3 | 11.58 | 4.3 | 9.1 | 37 | 78.5 |

[1] Capped vials.

EXAMPLE 12

Sample 4, described in Example 11, was acidified to pH 6.3 with sulfuric acid and zinc oxide, 86.9 g., was added in an approximately 1:1 mole ratio of cycloserine, resulting in a pH of 6.4, although the pH was slightly lower than desirable, no adjustment was made. The mixture was concentrated to 1140 ml. (18.5 lb.) and an equivalent volume of methanol was added. The resulting mixture was cooled to 5° C. and held at that temperature for 16 hours. It was then filfitered and washed with cold methanol to yield 272 g. of product.

Sample 5 was treated in a manner similar to that of sample 4 except that it was acidified to pH 6.5 and 43.3 g. of zinc oxide (approximately 0.5:1 mole ratio to cycloserine) was added giving a pH of 6.8. The solution was concentrated to 1020 ml., 1020 ml. of methanol was added, chilled to 5° C. and held for 16 hours, then filtered and washed with cold methanol to yield 241 g. of product. Tests were conducted at 75% relatively humidity at room temperature and at 45° C., and product in capped vials was tested seven weeks at 45° C. The results obtained are given in the following table:

| Sample No. | OCS, percent weight | Temperature | Initial | Cycloserine, percent weight | | | | | |
|---|---|---|---|---|---|---|---|---|---|
| | | | | 2 weeks | | 4 weeks | | 7 weeks [1] | |
| | | | | Actual | Percent retained | Actual | Percent retained | Actual | Percent retained |
| 4 | 27.2 | Room | 19.9 | 16.7 | 84 | 20.8 | 105 | | |
| | | 45° C | | 14.9 | 75 | 16.6 | 83.5 | 19.9 | 100 |
| 5 | 37.7 | Room | 18.2 | 14.8 | 81 | 20 | 109 | | |
| | | 45° C | | 17.7 | 97 | 18.2 | 100 | 17.7 | 97.7 |

[1] Capped vials.

EXAMPLE 13

The experiment of Example 11 was repeated except that 1 liter of filtered beer having a pH of 7.4 was acidified with sulfuric acid to pH 6.0. Zinc oxide was added at a mole ratio of 2 of zinc per mole of cycloserine and the precipitation step was effected by adding, after concentrating to 30 ml., 2 volumes (60 ml.) of a 1:1 mixture of methanol and 2-propanol in place of 1 volume of methanol. The recovery of cycloserine was 88% and of OCS, 100%.

EXAMPLE 14

The experiment of Example 11 is repeated except that isopropyl alcohol is substituted for methanol. A high yield of CS-OCS is obtained.

EXAMPLE 15

The experiment of Example 11 is repeated except that ethyl alcohol (specially denatured alcohol 3A) is substituted for methanol. A high yield of CS-OCS is obtained.

I claim:
1. A process for the production of an animal feed supplement containing a zinc complex of cycloserine and O-carbamyl-D-serine from a fermented beer containing them comprising the steps of:
   (a) adding to said beer a zinc compound having a nutritionally-acceptable anion in a mole ratio of from 1–2 of said zinc compound to 1 of cycloserine,
   (b) adjusting the pH of said beer to within the range of from 6.5 to 9.5 with calcium hydroxide, calcium oxide or calcium carbonate,
   (c) concentrating said beer at a temperature of up to about 60° C. at a pressure below atmospheric pressure to effect a reduction in volume of said beer to from about 10% to about 25% of the initial volume to produce a concentrated medium, and
   (d) drying said beer to produce said animal feed supplement containing zinc complex of cycloserine and O-carbamyl-D-serine.

2. The process of claim 1 wherein the said zinc compound is selected from the group consisting of zinc oxide, zinc acetate, zinc propionate, zinc tartrate, zinc sulfate, zinc chloride and zinc nitrate, the said pH is adjusted to within from 8.0 to 8.5, and said drying is effected by spray drying.

3. The process of claim 1 wherein the said zinc compound is zinc sulfate.

4. The process of claim 1 wherein the said zinc compound is zinc oxide.

5. The process of claim 1 wherein the said drying is effected by drum drying.

6. The process of claim 1 wherein the beer is filtered prior to adding said zinc compound and drying of said beer is effected by spray drying.

7. The process of claim 6 wherein the said zinc compound is selected from the group consisting of zinc oxide, zinc acetate, zinc propionate, zinc tartrate, zinc sulfate, zinc chloride and zinc nitrate, the said pH is adjusted to within from 8.0 to 8.5, and said drying is effected by spray drying.

8. The process of claim 6 wherein the said zinc compound is zinc sulfate.

9. The process of claim 6 wherein the said zinc compound is zinc oxide.

10. A process for the production of an animal feed supplement containing a zinc complex of cycloserine and O-carbamyl-D-serine from a fermented beer containing them comprising the steps of:
    (a) adding to said beer a zinc compound having a nutritionally-acceptable anion in a mole ratio of from 0.5–2 of said zinc compound to 1 of cycloserine,
    (b) concentrating said beer at a temperature of up to about 60° C. at a pressure below atmospheric pressure to effect a reduction in volume of said beer to from about 1.0% to about 25% of the initial volume to produce a concentrated medium, and
    (c) recovering said animal feed supplement.

11. The process of claim 10 wherein the beer is filtered prior to adding said zinc compound.

12. The process of claim 10 wherein the animal feed supplement is recovered by spray drying.

13. The process of claim 11 wherein the animal feed supplement is recovered by concentrating said medium to about 1.5 to about 3.5% by volume, adding a lower alkanol of from 1 to 3 carbon atoms, or a mixture thereof, in a volume approximately 1 to 2 times that of said medium, cooling the resulting mixture to within about 0-10° C. for a length of time sufficient to effect precipitation of said animal feed supplement, and separating same to produce said animal feed supplement.

14. The process of claim 13 wherein said lower alkanol is methanol.

15. The process of claim 13 wherein said lower alkanol is a mixture of methanol and isopropyl alcohol in about a 1:1 by volume ratio.

16. The process of claim 10 wherein whole beer is employed and said animal feed supplement is recovered by drum drying.

17. The process of claim 10 wherein said zinc compound is zinc oxide.

References Cited

UNITED STATES PATENTS

| 2,789,834 | 4/1957 | Harned | 260—307.1 |
| 2,832,788 | 4/1958 | Harris et al. | 260—307.1 |
| 3,025,216 | 3/1962 | Ziffer et al. | 99—2 |

FOREIGN PATENTS

| 787,741 | 12/1959 | Great Britain | 260—307.1 |

A. LOUIS MONACELL, Primary Examiner

R. M. ELLIOTT, Assistant Examiner

U.S. Cl. X.R.

99—2, 9; 260—299, 307